July 10, 1956  W. ERNST ET AL  2,754,107
CAPSULE WEIGHING KIT
Filed Dec. 27, 1952  5 Sheets-Sheet 1

*INVENTORS*
WALTER ERNST
WILLIAM R. HORST
BY *Toulmin & Toulmin*
ATTORNEYS

July 10, 1956

W. ERNST ET AL 2,754,107

CAPSULE WEIGHING KIT

Filed Dec. 27, 1952

INVENTORS
WALTER ERNST
WILLIAM R. HORST
BY *Toulmin & Toulmin*
ATTORNEYS

July 10, 1956  W. ERNST ET AL  2,754,107
CAPSULE WEIGHING KIT

Filed Dec. 27, 1952  5 Sheets-Sheet 4

INVENTORS
WALTER ERNST
WILLIAM R. HORST
BY
ATTORNEYS

July 10, 1956 W. ERNST ET AL 2,754,107
CAPSULE WEIGHING KIT
Filed Dec. 27, 1952 5 Sheets-Sheet 5

INVENTORS
WALTER ERNST
WILLIAM R. HORST
BY Toulmin & Toulmin
ATTORNEYS

United States Patent Office 2,754,107
Patented July 10, 1956

2,754,107

CAPSULE WEIGHING KIT

Walter Ernst, Dayton, and William R. Horst, Spring Valley, Ohio, assignors to The Commonwealth Engineering Company of Ohio, Dayton, Ohio, a corporation of Ohio Application December 27, 1952, Serial No. 328,247

14 Claims. (Cl. 265—27)

This invention relates to weighing devices; more particularly the invention relates to weighing devices having a high degree of accuracy over a very wide range; and still more particularly the invention is concerned with devices which operate on the principle of a change in the electrical characteristics of a transducer upon the application of a force thereto.

In the weighing of large objects of irregular shape, for example, airplanes, it has been found difficult to avoid side loading of the weighing mechanism. By side loading is meant that the forces applied to the weighing mechanism by the object being weighed are not all vertical but on the contrary the object exerts a large horizontal component on the mechanism thus leading to error in the results and not infrequently to distortion of the weighing mechanism itself.

In mechanism operating on the transducer principle wherein the applied load causes a change in the physical dimensions, and hence for example the electrical characteristics of a wire sensing member, the problem of side loading has been a particularly serious one. This is occasioned by the fact that the forces acting on the side walls of the transducer or load cell when they include horizontal components are not uniform over the whole wall but, on the contrary, one portion of the wall is required to absorb substantially all of the force occasioned by the horizontal components. This leads to distortion and even slight movement of the wall and results in error in the weighing result.

It is a primary object of this invention to provide a novel load cell which is substntially unaffected by side loading.

It is an important object of this invention to provide a novel load cell which is exceedingly accurate over wide ranges of loading.

It is a principal object of this invention to describe a novel plate member, a pair of which may be utilized to support a sensing member within a load cell.

It is a further object of this invention to describe in a load cell an arrangement of a wire sensing member, the electrical characteristics of which member are substantially unaffected, as a whole, by side loading on the cell.

Briefly, the structure of invention includes a heavy casing which encloses a cylindrical load cell of a rigid wall construction upon which is mounted a force cap for the transmission of stress to the load cell wall. Spaced apart within the cell and resiliently journaled in the side walls thereof are a pair of plates which support therebetween a wire sensing member. This sensing member is placed under an initial stress at which the wire has predetermined electrical characteristics and upon change of the wire stress a change takes place in the electrical characteristics, which change may be measured by a suitable electrical circuit to thereby indicate the degree of stress applied to the wire sensing member.

In the embodiment of the invention to be described with particularity hereinafter the stress to be measured is applied to the sensing member by movement of the supporting plates which themselves accurately follow the slight movements of the load cell wall occasioned by the application of load.

The invention including the arrangements for attainment of a high degree of accuracy will be more fully understood by reference to the following detailed description and accompanying drawings wherein.

Figure 1:
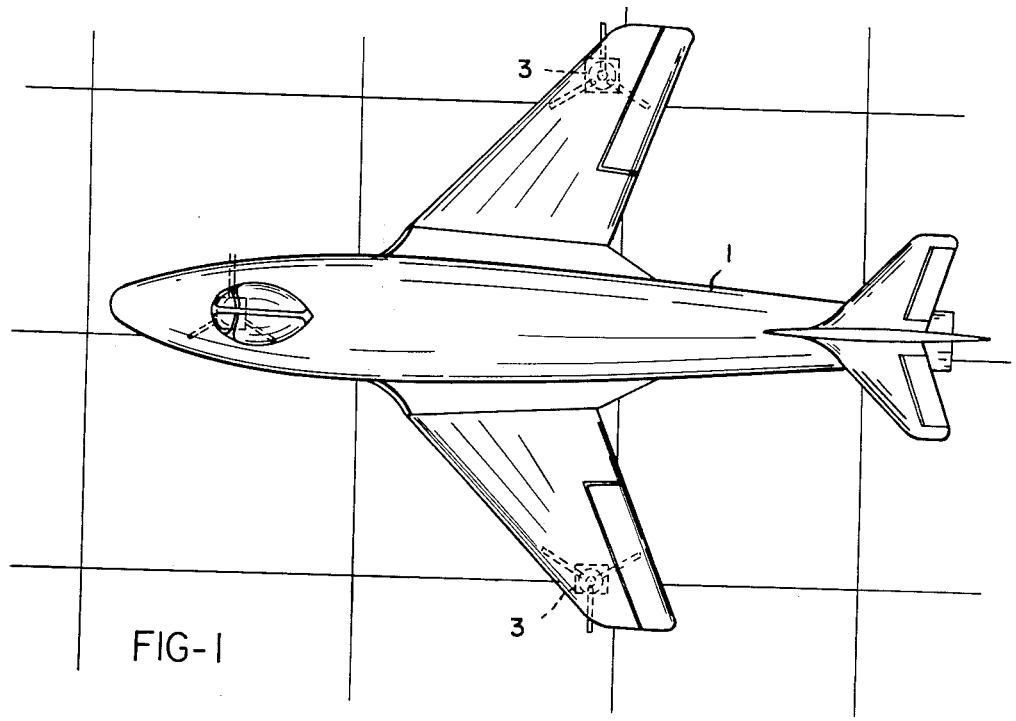
Figure 1 is a plan view of an airplane mounted on the weighing devices of invention.
Figure 2:
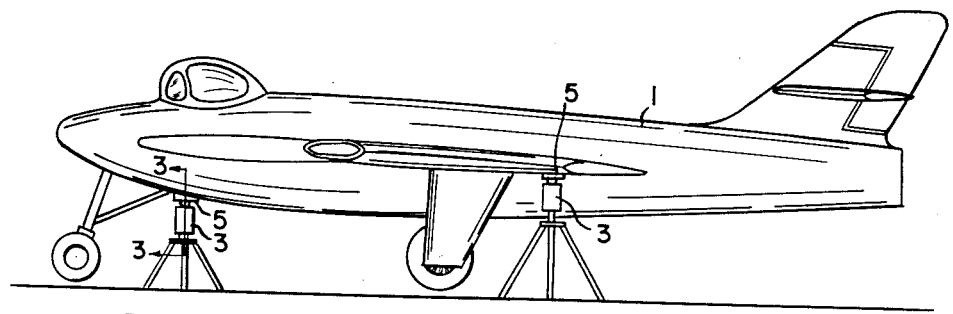
Figure 2 is an elevational view of the load cell of invention in supporting relation with a portion of an airplane.

Referring to the drawings and particularly Figures 1 and 2 there is shown at 1 an airplane which is mounted on load cells 3 at selected spaced points of the plane. The mounting of the plane is effected at jack points having bearing members 5 (Figure 3) which are supported in a cup-shaped portion 7 of force cap 9 of the load cell.

Figure 3:
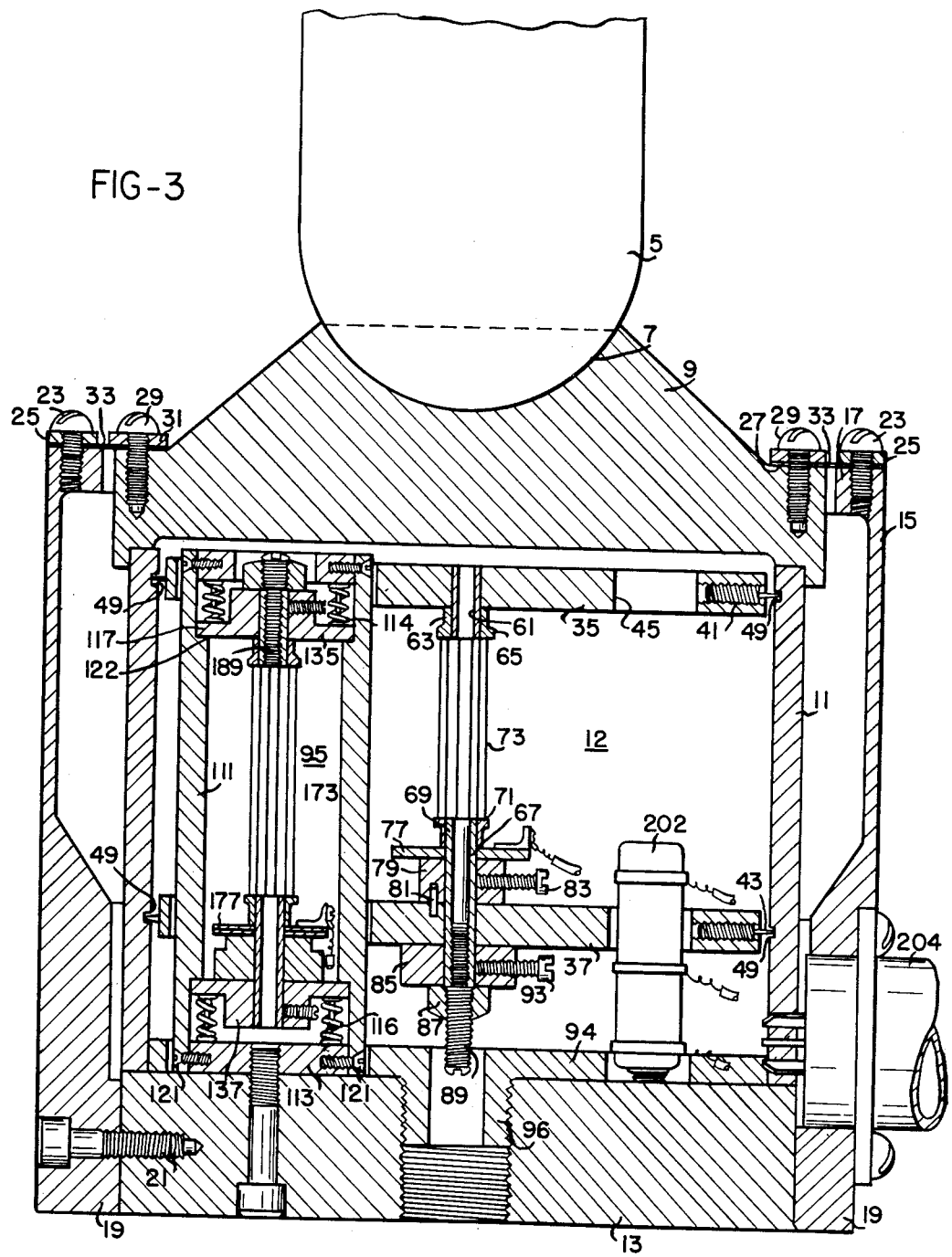
Figure 3 is a sectional view taken on line 3—3 of Figure 2.
Figure 4:
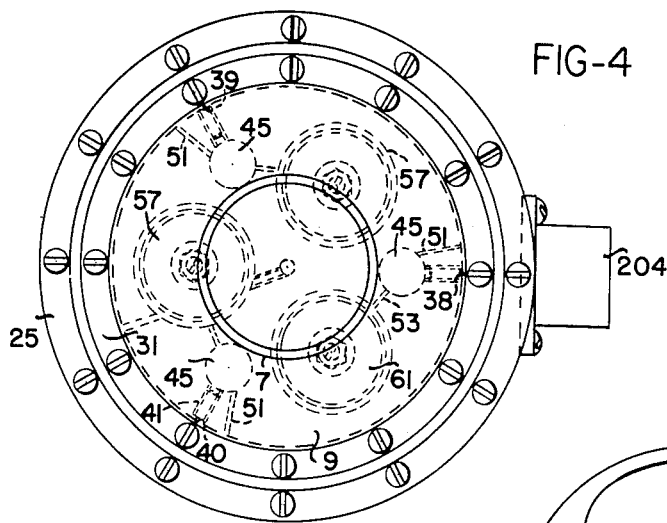
Figure 4 is a plan view of the load cell of Figure 2.

The load cell, as shown more clearly in Figures 3 and 4, comprises a cylindrical casing 15 which surrounds the wall 11 of the test cylinder 12. This test cylinder is closed at the top thereof by cap 9 and is adapted to receive the forces exerted on the cap 9; a base plate 13 effects closing of the casing and test cylinder at the bottom ends. The cylindrical casing 15 also has an upper inwardly extending peripheral lip 17 spaced from cap 9 and a lower inwardly extending portion 19 secured to base plate 13 as by threaded bolts 21.

Lip 17 is tapped at spaced intervals to receive screws 23 which retain ring member 25 on the upper surface of the lip; cap 9 is provided with a flattened portion 27 which is similarly tapped to receive screws 29 which retain ring member 31 in position. Also secured by the screws and beneath the ring members is a thin flexible diaphragm 33 which extends between cap 9 and lip 17 around the peripheries thereof. This diaphragm is of thin resilient steel and is of such a nature as to provide substantially no resistance to the movement of cap 9 past the stationary lip 17.

Within the test cylinder 12 there is mounted as shown most clearly in Figure 3 two plates 35, 37. Upper plate 35 is supported against longitudinal movement relative to wall 11 at spaced points 38, 39, 40 (Figure 4) by pins 41; lower plate 37 is similarly mounted in wall 11 by pins 43. To permit of mounting of the pins the plates have cut out portions as at 45 on plate 35 and a small Allen wrench or other suitable tool is placed in the opening to drive the threaded pins 41, 43 through tapped openings as at 47 in section 48 into a small V-shaped recess 49 of the wall 11. This type of mounting insures that the plates will accurately follow the movements of wall 11 and that all vertical stress transmitted to wall 11 by cap 9 will be reflected in movement of the plates 35, 37 without relative vertical movement between the plates and wall.

Figure 5:
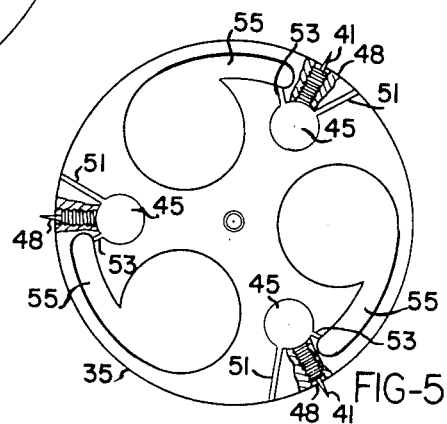
Figure 5 is a plan view of a novel plate member.
Figure 6:
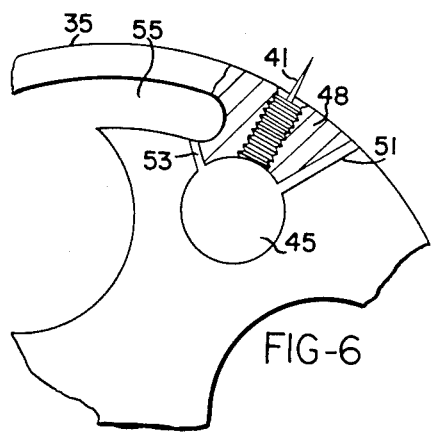
Figure 6 is an enlarged view of a portion of the stucture of Figure 5 partially in section.

To avoid the possibility of relative horizontal movement of the wall 11 with respect to plates upon change of pressure on the wall 11 the plates 35, 37 are further cut out as seen most clearly in Figure 5 to provide a spring effect at each pin mounting. Thus slit 51 which extends from cut out portion 45 through the plate edge, and aperture 53 which extends from cut out portion 45 to slot 55 almost completely isolate the section 48 and thus effectively form a spring which permits the pin 43 to readily follow any inward or outward movement of wall 11. Similar provision for spring action is made at each of the pin mountings in each of plates 35 and 37.

Figures 7, 8:
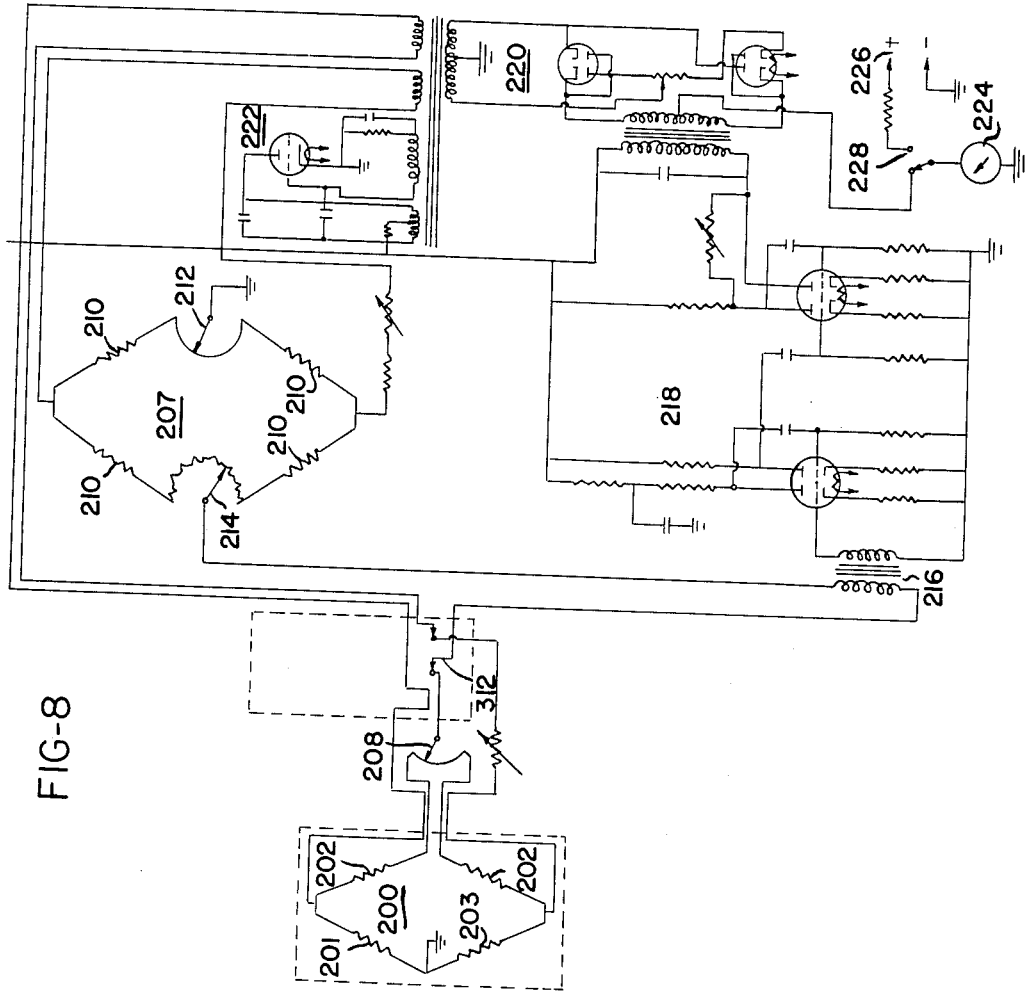
Figure 7 is a view partially in section indicating the manner of mounting the wire sensing member.
Figure 8 is a schematic diagram of an electrical circuit useful in conjunction with the load cell of invention.

Secured centrally into plate 35 is an internally threaded sleeve 61 (Figures 3 and 7) which carries at its lower extension an electrically non-conductive collar 63 of plastic which is provided with a plurality of peripheral protuberances 65 about the lower periphery thereof (Figure 7). Positioned directly below sleeve 61 (to the right in Figure 7) and in line therewith is a sleeve 67 which is movably mounted in plate 37; this sleeve is provided at its upper extension with a non-conductive collar 69 having peripheral protuberances 71.

Secured between the non-conductive members or collars 63, 69 are a multiplicity (12 in the present instance) of strands 73 of very fine wire. The strands are formed of a single piece of wire which is initially secured to one of the collars by a thermosetting resinous material and is then passed to the other collar where it is passed about one of the protuberances and then returned about the first collar.

Figure 7 shows this arrangement most clearly and the method of mounting the wire will be described in detail hereinafter in connection with that of Figure 7.

A terminal plate 77 is secured to collar 69 and may serve to support the same in conjunction with sleeve 67; this terminal plate is spaced from plate 37 by a band 79 which is held from rotation on sleeve 67 by screw 83. Dowel pin 81 in plate 37 maintains sleeve 67 and band 79 in such relation with plate 37 that vertical movement of the sleeve and band but not rotational movement may take place; band 79 however is not in contact with the plate but is always spaced at least slightly therefrom to permit of vertical movement of the band when required. Screw 83 in band 79 is adapted to contact sleeve 67 to prevent longitudinal and rotational movement of the band with respect to the sleeve when so desired.

Sleeve 67 has an internally threaded portion thereof extending below plate 37 and a block 85 integral with or fixedly secured to the plate surrounds this extension. Nut 87 which is welded to the block mounts over the compound screw 89 the small diameter and smaller pitch portion 91 of which is received within the sleeve and block while the larger diameter portion is adapted to move within the fixed nut. Screw 93 is provided to contact sleeve 67 and prevent longitudinal and rotational motion thereof when so desired. This structural arrangement permits very small increments of vertical movement to be given to sleeve 67 and accordingly to strands 73 to place them in tension after which tightening of screws 93 serves to fixedly secure the sleeve and hence the wires in a tensive condition. It is also now apparent a spacing must exist between fixed plate 37 and band 79 to permit of the tensioning movement.

Referring now to Figure 3 it will be noted that a reference control section indicated generally at 95 is provided within test cylinder 12 through plate apertures and is spaced from the plates; this unit serves to balance out the stray effects due to temperature, which would otherwise cause error in the operation of the cell. To this end the control section is constituted in much the same manner as the test cylinder 12 and accordingly the same numerals raised by 100 are utilized to indicate similar members. Thus wall 111 is closed at the lower end by plug 113 and screws 121 secure plug 113 in position. Plates 135 and 137 are spring loaded as at 114 and 116, respectively; springs 114 are retained in position by lip 117 and the abutment 122 upon which plate 135 rests; spring 116 is retained by an internal lip which abuts plate 137 and by the plug 113. Thus the plates 135 and 137 similarly to their counterparts 35 and 37 are resiliently mounted.

It will be observed that in the reference control section the apparatus for the sake of convenience is reversed to some extent. Thus upper plate 135 mounts differential screw 189 and adjustment thereof may be made readily when force cap 9 is removed from the structure. Otherwise the control section 95 is substantially similar to cylinder 12, the wires 173 being similarly mounted and having lead out connections at plate 177.

Figure 7 illustrates the manner in which the mounting of the wire sensing member comprising the strands 73 is made and this is applicable also to the sensing member strands 173. Initially before application of the wire, a long screw 62 is passed through the internally threaded sleeve 61 which supports collar 63; the screw 62 is then also threaded into the upper portion of sleeve 67 where it may abut the compound or differential screw 89.

With the collars 63 and 69 thus held in spaced relation at a convenient distance on the screw 62 the wire constituted of strands 73 has an end thereof secured by any suitable thermosetting material to collar 69. The wire is then passed upwardly about a protuberance of collar 63, then downwardly about a protuberance of collar 69, up to collar 63 again and so on until the desired number of strands 73 is obtained. The stranding as shown in Figure 3 is started and completed on the lower collar to facilitate connection of the wire ends to terminals on plate 77. The stranding is also effected under a very light tension, as about 5 grams, applied to the wire in order that the strands will lie straight. The geometrical arrangement of a cross-section taken through the strands is that of a closed geometrical figure, as a circle, and is of considerable importance as will be described hereinafter. Accordingly the peripheral protuberances which support the wire should be accurately molded for optimum results and the sleeve 61 (Figure 3) must center accurately in plate 35.

The physical arrangement of the wire strands and the electrical characteristics of the sensing elements of each of test cylinder 12 and the reference control section 95 are identical and accordingly only the sensing element of the cylinder will be specifically referred to in this connection.

The sensing element having the wire strands under the slight noted tension is connected to any suitable measuring instrument, for example, as an arm in a Wheatstone bridge and the element is adjusted to a predetermined resistance value, as 500 ohms.

When the wire strands have been mounted as described and as indicated in Figure 7, with lower plate 37 in position in the test cylinder 12, the assembly of Figure 7 is mounted in the plate with pin 81 engaging in plate 37 (Figure 3). To effect this mounting readily and to permit of easy handling the sleeve 61 may be provided with a temporary mating portion 61a; with the test cylinder 12 then having only plate 37 and block 85 mounted therein. The compound screw 89 is passed through the central aperture in plate 37 whereafter nut 87 may be conveniently threaded over the screw and soldered to the block 85.

The sleeve 61, supported on the screw 62, is then force fit centrally into plate 35 by pasing the plate over the sleeve 61 through the upper open end of test cylinder 12 and sleeve portion 61a and screw 62 are then removed through the top thereof. The wire strands 73 are then under a slight tension and may be brought to a predetermined tension by operation of differential screw 89. This adjustment is made with reference to the electrical characteristics of the wire, preferably the resistance characteristics and will be described hereinafter in connection with the operation of the electrical circuit of Figure 8.

After positioning of the plates 35, 37 or if preferred prior thereto the reference control section 95 is mounted, resistor unit 202 is inserted, and all electrical connections made through outlet 204; then a pilot disc 94 having a depending central portion 96, apertured for the passage of a tool to permit adjustment of the differential screw, is inserted; the purpose of this pilot disc is to prevent movement of the test cylinder 12 within the casing 15 which movement might otherwise occur particularly under conditions of no load. The securing action is attained by engagement of the portion 96 with the base 13 which is then secured by screw 21 to wall portion 19 as shown in Figure 3. The sensing elements it will be understood are at this time under a predetermined tension and have identical electrical characteristics. Accordingly the cell units thus assembled are ready for use.

Referring to Figure 8 and the electrical circuit arrangement which is adapted to measure the movement of the wires of the sensing element and to cancel out the effect of temperature by means of the electrical connections illustrated schematically in Figure 3, there is indicated is indicated in Figure 8 at 200 a bridge circuit having resistor arms 201, 202, 203. Resistor 201 represents or is in fact the strain gauge wire strands indicated at 73 in Figure 3 while resistor 203 represents the sensing element strands 173; resistor 202 is a balancing resistor. It will thus be noted that when the tension in each of the groups of strands 73 and 173 is adjusted at a given temperature to provide a balanced bridge that temperature changes of the surroundings will affect the wires of each of the bridges in the same way and to the same degree, and the bridge will remain balanced thus cancelling out the effect of temperature on the load cell sensing member. However when the group of strands 73 is stressed due to mechanical loading the bridge due to the resistance change in the strands 73 will become unbalanced and the measurement of this unbalance indicates the stress applied.

Bucking the output of bridge 200 is the output of bridge 207 having fixed resistors 210; the signal output appearing between the bridges is applied to the input transformer 216 of a standard amplifier 218 and the output of this latter component is directed to a phase detector circuit 220; oscillator circuit 222 also feeds into phasing circuit 229 and thereby the output of amplifier 218 is compared for phase with the standard reference voltage derived from the oscillator circuit 222.

Oscillator 222 also provides a standard A. C. voltage preferably 1000 cycles to bridges 200 and 207.

The output of the phasing circuit is a D. C. voltage, the polarity of which depends on the comparison of the signal with respect to the reference oscillator signal with regard to phase; accordingly the milliammeter 224 which receives the D. C. voltage output serves as a null indicator and the pointer thereof will swing left or right of center depending upon the D. C. polarity. This affords a visual indication of the manner in which elements 212 and 214 must be adjusted.

A source of power indicated at 226 provides a supply for a dynamotor; contact 228 provides means for checking a battery supply (24 v.) since the battery may be connected thereby through meter 224 to afford a visual indication of battery capacity.

Figure 10:
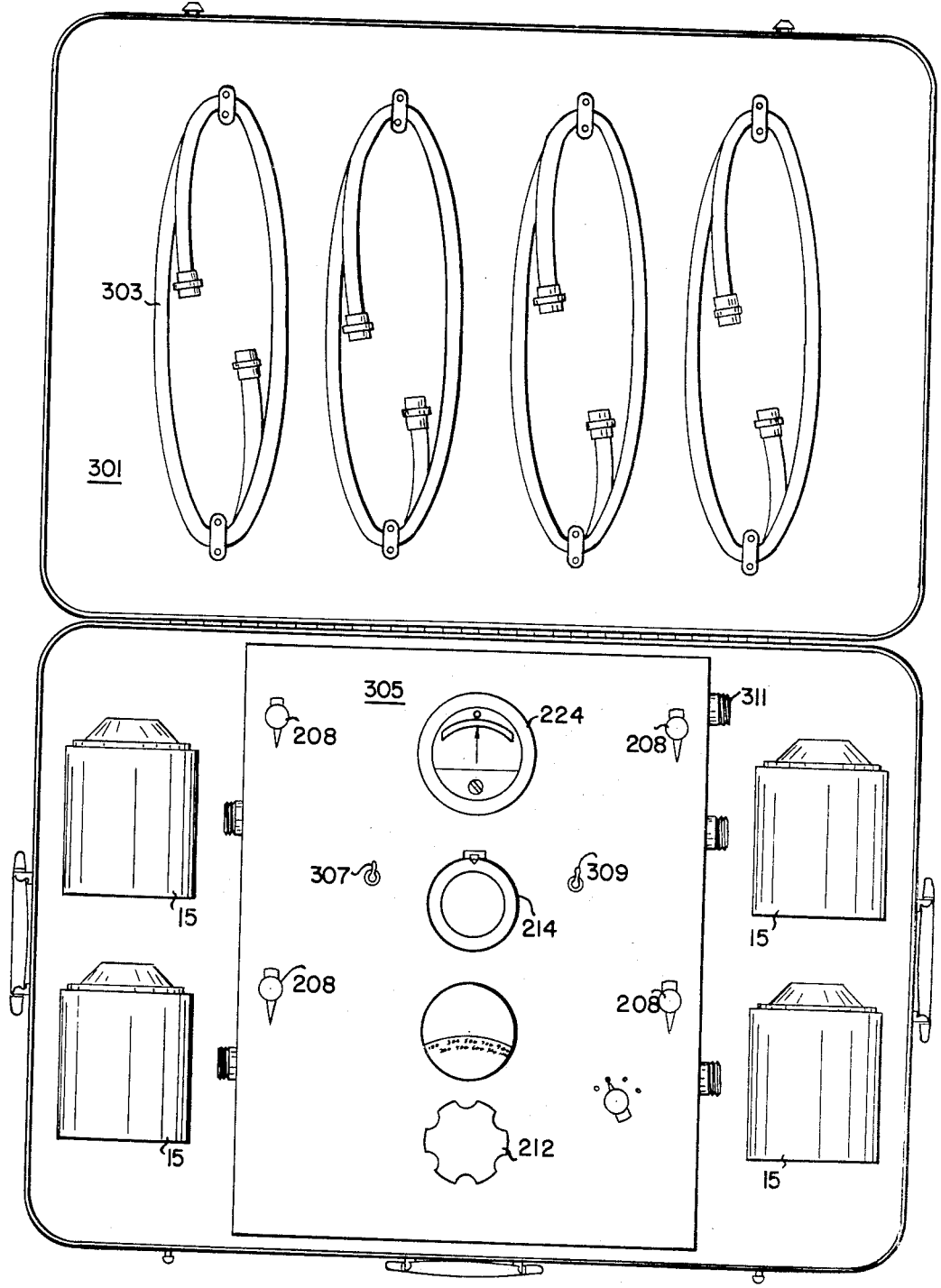
Figure 10 is a view of a portable unit of invention including a panel board.

Figure 10 illustrates the unit of invention mounted in a suitcase 301 with connecting cables 303 positioned in the lid. The casings 15 containing the mechanism of the test cylinder described hereinbefore are mounted in the base of the case on opposing sides of the panel 305. A power switch is shown at 307, the battery check switch handle at 309, and a power inlet is indicated at 311. Four zero sets are indicated at 208 (Figure 8) one for each test cylinder and the controls bearing the same legends as on the electric circuit diagram (Figure 8) are shown centrally positioned on the panel. A selector switch 312 shown at the lower right permits measurement of each of the cells individually and this rotary switch is similarly designated in Figure 8; while Figure 8 and the description in general have been confined to one load cell, the operation of all are similar there being of course only one master circuit in the unit as in the right hand of Figure 8.

To use the unit of invention the load cells are removed from the case 301, mounted, electrically connected, and the instrument is zeroed under no load for each cell. To effect this latter operation, the power switch 307 is thrown to "on" which causes oscillator 222 to feed a 1000 cycle signal to each of bridges 200 and 207, controls 212 and 214 are zeroed manually to set bridge 207, the selector switch is then thrown as to number 1 for the checking of the number 1 cell and the zero set corresponding to the number 1 load cell is adjusted to balance as indicated by the pointer at 224. The other cells are similarly balanced the selector switch of course being changed to accomplish this and the load is then applied to the cells.

Summarizing, with scales 212 and 214 zeroed bridge 200 is placed in the circuit and knob 208 is adjusted to balance bridge 200 in the condition of no load on the sensing members and the load is then applied. As the load is taken by the force cap 9 the wall 11 compresses moving the plates 35, 37 more closely together and thereby changing the electrical characteristic of the sensing member strands 73 and hence the resistance of the resistor 201. The tensively stressed strands will be compressed, in fact the resistance will decrease, and the bridge of which the sensing member comprised of the strands is a component will become unbalanced. The voltage output of the bridge 200 caused by the unbalance is fed through input transformer 216, amplified and compared with the oscillator output, the resultant of these serving to actuate meter 224. The reading of meter 224 indicates the direction in which the zeroed balancing members 212 and 214 must be adjusted to buck out the output of the bridge 200. Accordingly with the selector switch at position 1 for the number 1 cell upon application of load the pointer of 224 moves and adjustment of 214 and 212 causes the meter to return to zero. The dials associated with 212 and 214 indicate the stress taken by strands 73, the dial associated with 212 in the present case indicating the load in steps of 10 pounds while the dial associated with 214 indicates the load in steps of 5,000 pounds up to 50,000 pounds. The reading of the loads applied to each of the cells is taken in the same manner and the arithmetic sum is the total supported by the cell combination, it being understood that any convenient number of cells may be used.

Figure 9:
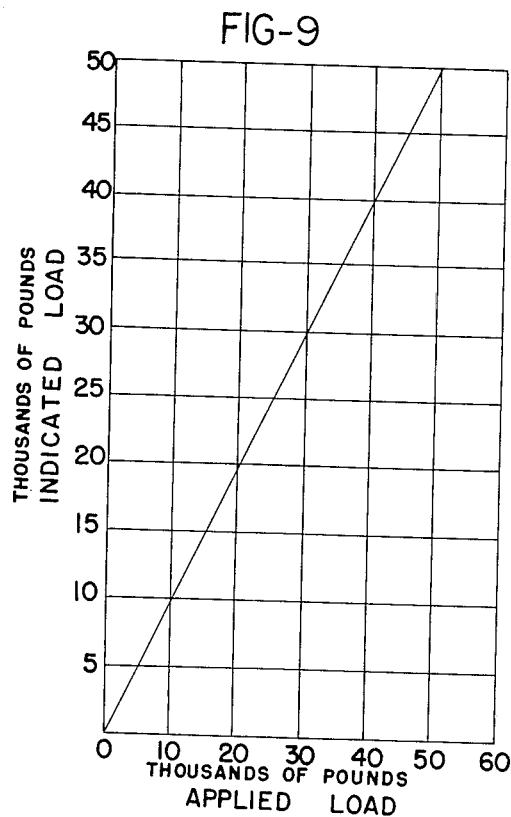
Figure 9 is a graph indicating the response characteristics of the load cell when a known load is applied thereto.

The accuracy of the instrument described is substantially uniform at all loadings as may be seen from Figure 9 wherein known loads were measured and the known values plotted against the measured values. It will be noted that a straight line results indicating uniformity. The accuracy of the instrument is about 0.1 of 1% even under full load conditions, 50,000 in the present instance. In obtaining this accuracy several structural features of the apparatus are of extreme importance and will now be discussed.

The casing 15 it will be noted from Figure 3 is spaced from the wall 11 of the test cylinder 12. This permits of substantially free movement of this wall under applied load and is essential to optimum accuracy over wide load ranges. However where the range is limited a satisfactory cell may be produced even if the lower portion of casing 15 contacts wall 11.

The plates 35, 37 are preferably spring mounted as shown in Figure 3 to follow the movement of wall 11 accurately as by sliding under the influence of the spring arms on the pins. Again satisfactory cells over limited ranges of loading may be produced without the spring arm effect and by rigidly securing the plates to the wall 11. A cell exceedingly accurate over the range of 15,000 to 35,000 pounds for example may be produced with substantially solid plates, rigid wall connectors and with the lower portions of casing 15 contacting wall 11.

A very important feature as already noted is the mounting of the sensing members. A cross-section taken through these members may have the shape of a circle, ellipse, square or any desired configuration but to avoid side loading effects it is essential that the neutral axis of the geometrical figure lie along the neutral axis of the test cylinder 12; it is also essential that when load is applied that a shift in the neutral axis of the cylinder 12 be accompanied by a shift in the neutral axis of the wire sensing members. Under these conditions a side loading resulting from the application of a force having a horizontal component will cause the wires on one side of the sensing member to be compressed and the wires on the other side are tensioned a like amount thus balancing out the side load effect since the compressed members will attain upon release of tension a lower resistance while the resistance of the tensioned strands is increased.

It will now be appreciated that it is desirable to have plates 35, 37 movable to permit the neutral axes to remain exactly coincident. While over given load ranges for given constructions of test cylinders this may be accomplished without such movement it is clear that under some load conditions a rigidly fixed plate assembly will vary from the neutral axes to some degree resulting in the measurement of side loading effects and hence inaccuracy.

It will also now be seen that the use of pilot disc 94 is an important feature of the invention for it inhibits any shifting movement of wall 11 at no load without restricting the movement of the wall under compressive loading.

The mounting of the wire strands over the members 63, 69 at a spaced distance from the plates is an additional feature which aids in maintaining the two noted neutral axes coincident for thereby a relatively long distance between plates is maintained while the possibility of error in the alignment of the axes under applied distorting forces is minimized by the shorter strand lengths.

While the cell has been described in connection with the circuit particularly adapted to measure resistance it will be readily understood by one skilled in the art that inductive or capacitative effects may similarly be relied upon by substituting for the resistance wire sensing member comprised of strands 73 and 173 inductive or capacitative means. It is only necessary that the inductor or capacitator be movably mounted for moving under stress and that they may be arranged about the neutral axes, all other cell features remaining substantially the same.

The electrical circuit referred to hereinbefore is described in detail in copending application of Leonard A. Erickson, Serial No. 291,387, filed June 3, 1952, issued June 7, 1955, as Patent Number 2,709,916, and assigned to the same assignee as the present invention.

It will be understood that this invention is susceptible to modification in order to adapt it to different usages and conditions and accordingly, it is desired to comprehend such modifications within this invention as may fall within the scope of the appended claims.

We claim:

1. In a measuring device, a wall enclosing a spacing, a pair of spaced plates in the spacing mounted in said wall for movement therewith, a force cap on one end of said wall for the application of stress thereto to occasion movement of the wall, a base plate supporting the wall at the other end, and a sensing member comprising an unbonded wire strain gauge secured between said pair of spaced plates for movement thereof with the wall and plates, the neutral axes of said wall and sensing member being substantially coincident.

2. In a measuring device, a wall enclosing a spacing, a pair of spaced plates in the spacing mounted in said wall for movement therewith, a force cap on one end of said wall for the application of stress thereto to occasion movement of the wall, a base plate supporting the wall at the other end, and a sensing member comprising an unbonded wire strain gauge, the wire being initially tensively stressed and secured between said pair of spaced plates for movement thereof with the wall and plates, the neutral axes of said wall and sensing member being substantially coincident.

3. In a weighing device, a cylindrical wall enclosing a spacing, a pair of spaced apertured plates in the spacing mounted in the wall and each plate having spring arms and pins carried thereon for occasioning resilient engagement of the plates with the wall, a force cap on one end of said wall for the application of stress thereto to occasion movement of the wall, a base plate supporting the wall at the other end, and a tensively stressed wire sensing member secured between said plates for movement thereof with the wall and plate, the neutral axes of said wall and sensing member being substantially coincident at no load and under stress applied to the force cap.

4. In a weighing device, a cylinder having a wall defining a spacing said wall having recesses in the interior surface thereof, a pair of horizontally positioned spaced apertured plates in said spacing, said plates having spring-like arms integral therewith forming the periphery thereof and adapted to follow movement of the wall, pins laterally extending from the arms of the plates into the recesses of the wall and slidingly securing said plates in said wall, a force cap mounted on said cylinder at one end for the application of stress thereto to occasion movement of the wall, a base plate plate supporting the wall at the other end, and a tensively stressed wire sensing member secured vertically between said plates, the neutral axes of said wall and sensing member being substantially coincident at no load and under stress applied to the force cap.

5. In a weighing device, a pair of relatively movable plates spaced apart in vertical relation along an axis, and a sensing member comprising an unbonded wire strain gauge the wire being of a single length formed into a plurality of integral strands secured between the plates, the strands being uniformly disposed about said axis.

6. In a weighing device, a pair of relatively movable plates spaced apart in vertical relation and defining an axis passing centrally through the plates, and a sensing member comprising an unbonded wire strain gauge the wire being of a single length formed into a plurality of integral strands secured between the plates and defining a neutral axis which is coincident with the axis passing centrally through the plates.

7. In a weighing device, a cylinder having a vertical axis, a pair of circular plates horizontally disposed in vertical relation along said axis and having the centers thereof coincident with said axis, and a sensing member comprising an unbonded wire strain gauge the wire being of a single length formed into a plurality of integral strands secured between the plates and the neutral axis defined by the strands of wire being coincident with said vertical axis.

8. In a weighing device, a cylinder having a vertical axis, a pair of circular plates horizontally disposed in vertical relation along said axis and having the centers thereof coincident with said axis, and a tensively stressed sensing member comprising an unbonded wire strain gauge the wire being of a single length formed into a plurality of integral circularly disposed strands secured between the plates and having the neutral axis thereof coincident with said vertical axis.

9. In a load cell a spring-like plate structure adapted for slightly engaging a force responsive retaining wall of the cell and to retain an unbonded strain gauge of the sell in position upon wall movement comprising a plate having spring-like arms defining the periphery of the plate, the arms being separated by slits through the plate edge terminating in cut-out portions of the plate, said arms having slidable securing means passing therethrough from a cut-out portion and extending from the plate periphery for sliding engagement with the cell wall.

10. In combination for use in a load cell, a cylinder having an interior wall provided with recesses the cylinder being adapted to be stressed axially, a plate horizontally positioned in the cylinder and having spring-like arms defining the periphery of the plate, the arms being separated by slits through the plate edge terminating in cut-out portions of the plate, and pin means passing through said spring-like arms slidingly engaging the wall of the cylinder at the recesses, the plate being constructed and arranged to follow movement of the wall axially of the cylinder and the spring-like arms being constructed and arranged to expand and contract with lateral movement of the wall.

11. In a measuring device, a pair of open-ended spaced concentric cylinders the inner of which is movable within the outer, said inner cylinder having a pair of spaced horizontally extending plates supported on the inner wall thereof for movement axially with the wall, an unbonded wire strain gauge supported between the plates, means to apply a stress to the inner cylinder at one end thereof, a pilot disc within the other end of the inner cylinder and engaging the same, and a base plate securing the outer cylinder and pilot disc together whereby shifting movement of the inner cylinder as a whole within the outer cylinder is prevented.

12. In a measuring device, a pair of open-ended spaced concentric cylinders the inner of which is movable within the outer, said inner cylinder having a pair of spaced horizontally extending plates supported on the inner wall thereof for movement axially with the wall, an unbonded wire strain gauge supported between the plates, means to apply a stress to the inner cylinder at one end thereof, a pilot disc within the other end of the inner cylinder and engaging the same, said disc having a depending portion, and a base plate securing the outer cylinder and pilot disc together, said plate having an opening into which the depending portion of said disc extends.

13. In a sensing member structure for a weighing device, a series of strands of wire formed of a single length of wire and uniformly disposed about an axis, electrical insulating means supporting said wires in tensive stress, a pair of sleeve means supporting said insulating means, and means to move one of said sleeve means with respect to the other of said sleeve means to place said wires in said stress.

14. In a sensing member structure for a weighing device, a series of strands of wire formed of a single length of wire and uniformly disposed about an axis, electrical insulating means supporting said wires in tensive stress, a pair of sleeve means supporting said insulating means, and differential screw means engaging one of said sleeve means to move said sleeve means with respect to the other of said means to place said wires in said stress.

References Cited in the file of this patent
UNITED STATES PATENTS

| | | |
|---|---|---|
| 923,313 | Anderson | June 1, 1909 |
| 2,036,458 | Carlson | Apr. 7, 1936 |
| 2,414,161 | Moore | Jan. 14, 1947 |
| 2,488,347 | Thurston | Nov. 15, 1949 |
| 2,488,348 | Ruge | Nov. 15, 1949 |
| 2,488,349 | Thurston | Nov. 15, 1949 |
| 2,597,751 | Ruge | May 20, 1952 |
| 2,670,195 | Baker | Feb. 22, 1954 |